United States Patent [19]

Kumamura et al.

[11] Patent Number: 5,143,736
[45] Date of Patent: Sep. 1, 1992

[54] NOZZLE TOUCH DEVICE IN AN INJECTION MOLDING APPARATUS

[75] Inventors: Masaaki Kumamura, Yokohama; Ryohei Inaba, Kawasaki; Shojiro Danmoto, Ushiku; Mitsuo Arai, Chichibu, all of Japan

[73] Assignee: Canon Kabushiki Kaisha, Tokyo, Japan

[21] Appl. No.: 531,639

[22] Filed: Jun. 1, 1990

[30] Foreign Application Priority Data

| Jun. 2, 1989 [JP] | Japan | 1-64000[U] |
| Jun. 19, 1989 [JP] | Japan | 1-70806[U] |
| Jun. 19, 1989 [JP] | Japan | 1-70807[U] |
| May 16, 1990 [JP] | Japan | 2-127889 |

[51] Int. Cl.$^5$ .............................................. B29C 45/66
[52] U.S. Cl. .................................. 425/567; 425/569; 425/589
[58] Field of Search ................ 425/589, 450.1, 567, 425/569

[56] References Cited

U.S. PATENT DOCUMENTS

| 4,298,332 | 11/1981 | Aoki | 425/589 |
| 4,299,791 | 11/1981 | Aoki | 425/569 |

Primary Examiner—Timothy Heitbrink
Attorney, Agent, or Firm—Fitzpatrick, Cella, Harper & Scinto

[57] ABSTRACT

An injection molding apparatus includes a screw housed in a heating cylinder, a rotator for rotating the screw, a linear mover for moving the screw linearly, a motor for driving the rotator, a driver for driving the linear mover, and a base member for supporting the screw, the rotator, the linear mover, the motor and the driver. The screw, the linear mover and the rotator are supported by the base member along a vertical line against the ground. In the injection molding apparatus is a nozzle touch mechanism which includes a support member mounted on the base member, and a member for mounting a die member mounted on the support member to support the die member. The die member is mounted by the member for mounting the die member so that a molding material entrance port of the die member engages an injection port of the heating cylinder. The nozzle touch mechanism further includes a spring member provided between the member for mounting a die member and the support member so as to exert a nozzle touch force on the heating cylinder and the die member.

4 Claims, 10 Drawing Sheets

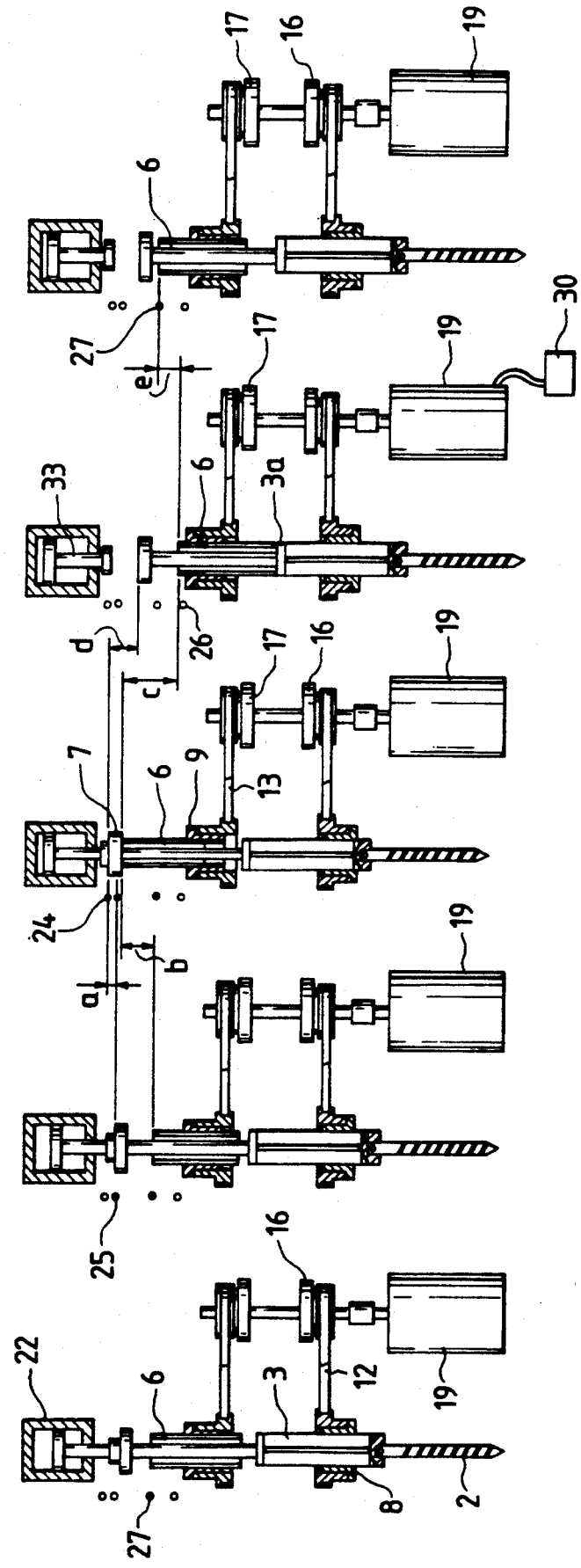

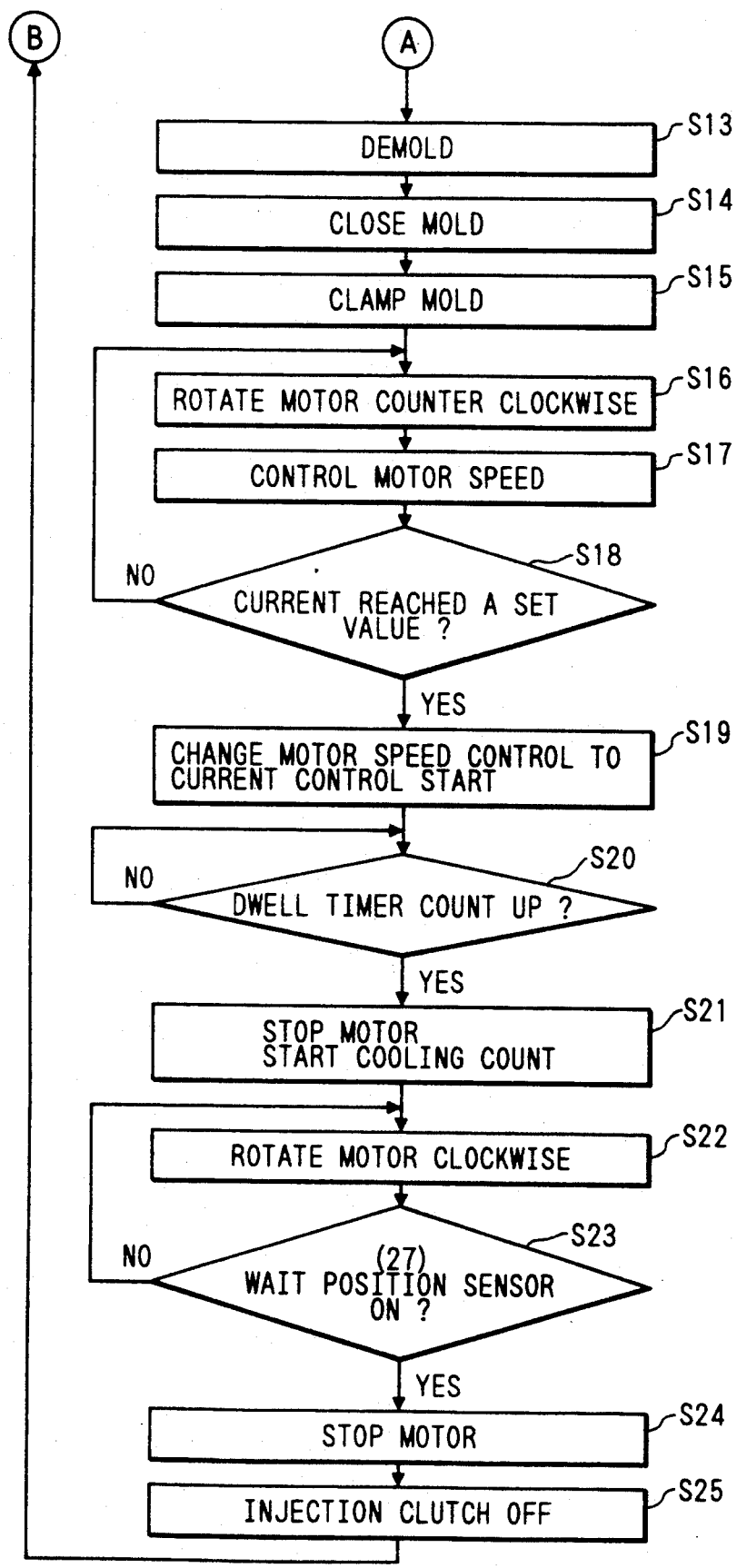

NOZZLE TOUCH DEVICE IN AN INJECTION MOLDING APPARATUS

BACKGROUND OF THE INVENTION

1. Field of the Invention

This invention relates to a nozzle touch device in an injection molding apparatus which is suited for a compact electric type injection molding apparatus.

2. Related Background Art

In an injection molding apparatus particularly an injection molding apparatus having a hot runner, when a material to be molded in a heating cylinder is to be injected from a nozzle at the end of the cylinder into a metal mold, the nozzle is urged against the entrance of the runner portion of the metal mold so that the molten material to be molded will not leak through the nozzle.

An injection molding apparatus according to the prior art is shown in FIG. 9 of the accompanying drawings. The injection molding apparatus shown in the figure is constructed as a horizontal type apparatus, and comprises chiefly a bed 51, an injection unit 52 on the bed 51, a mold clamping mechanism 53, and a driving hydraulic cylinder 62 holding the injection unit 52 by means of a slide base 54 and moving the slide base in parallel to the injection unit 52. The injection unit 52 is provided with a heating cylinder 55 containing a screw (not shown) therein, a drive source 63 for measurement and blending connected to the rear of the heating cylinder 55, and a drive source 56 for injection. Resin material charged from a hopper 57 into the heating cylinder is blended by the rotation of the screw and is gradually accumulated in front of the screw and injected from a nozzle 58. The mold clamping mechanism 53 is provided with a fixed side mold 59 fixed to the rising portion of the bed 51, and a movable side mold 60 for effecting the opening and closing movement of the mold relative to the mold 59 by a drive source 64.

To effect nozzle touch in this apparatus, the entire injection unit 52 is moved from the hydraulic cylinder 62 and the nozzle 58 is urged against the runner entrance recess 61 of the mold 59 to thereby accomplish nozzle touch.

However, the nozzle touch mechanism of the prior-art injection molding apparatus as described above is of such a construction that the entire injection unit 52 is moved relative to the fixed side mold 59, and this has led to the problem that the driving hydraulic cylinder 62 becomes bulky.

On the other hand, we have devised an electric type injection molding apparatus which, as compared with the prior-art injection molding apparatus, is compact and slim and can also be vertically installed.

However, a conventional nozzle touch mechanism, when mounted on such electric type injection molding apparatus, makes the apparatus bulky and therefore, a novel nozzle touch mechanism suited for an injection molding apparatus constructed compactly and slimly has been desired.

SUMMARY OF THE INVENTION

The present invention has been made in view of such circumstances and an object thereof is to provide a nozzle touch mechanism which is constructed of a simple mechanism and suited also for a compact and slim vertical type injection molding apparatus.

A second object of the present invention is to provide, in a system wherein after the demolding operation for the mold opening of an upper die and a lower die, the dies are again closed to effect a molding cycle, a device for logically controlling the mold closing operation of the upper die and the lower die and the mold clamping operation subsequent thereto on the basis of the detection of an electrical signal to thereby facilitate the automation of an injection molding apparatus.

A third object of the present invention is to provide, in an injection molding apparatus wherein measurement, blending and injection are effected by a single motor, a device for detecting a signal indicative of the completion of the mold clamping of mold clamping means, and detecting the direction of rotation of said motor on the basis of the signal to thereby achieve a reduction in cost and avoid the complication of the construction of the apparatus.

BRIEF DESCRIPTION OF THE DRAWINGS

FIGS. 3A–3E illustrate the operation of the present apparatus.

FIGS. 4A, 4A-1, 4A-2 are flow charts.

DESCRIPTION OF THE PREFERRED EMBODIMENTS

A) Description of the Apparatus

Figure 1:
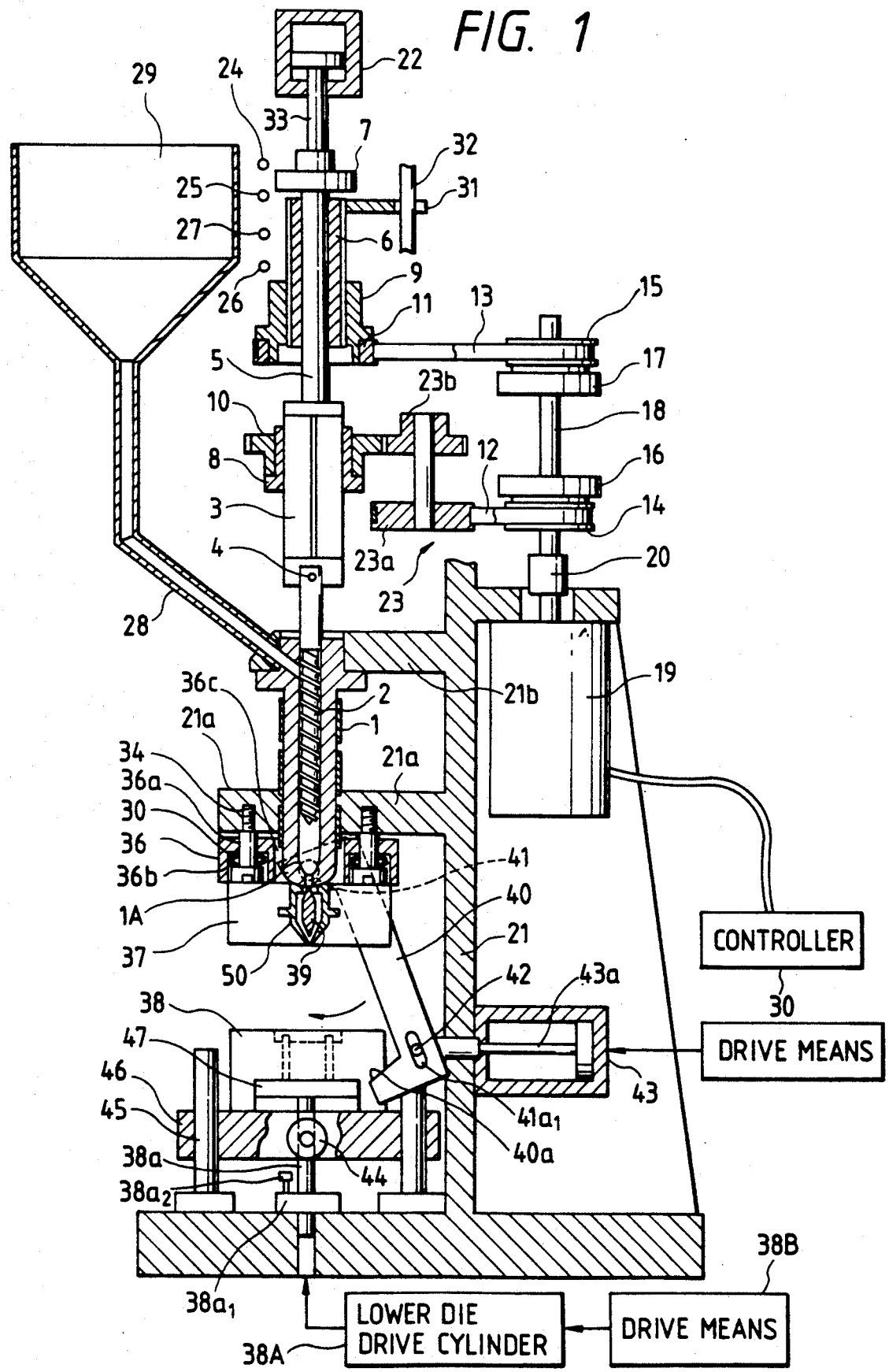
FIG. 1 shows, partly in cross-section, the general construction of an electric type injection molding apparatus according to an embodiment of the present invention.

The electric type injection molding apparatus of a first embodiment, as shown in FIGS. 1 and 2, comprises a screw 2 contained in a heating cylinder 1, a spline shaft 3 fixed to the screw 2 by a pin 4, a hollow ball screw guide shaft 5 connected to the upper portion of the spline shaft 3 by a bolt or the like, not shown, and having a stopper plate 7 secured to the upper end thereof, a hollow ball screw 6 slidably fitted to the ball screw guide shaft 5, and a cylinder rod 33 provided above the guide shaft 5 and bearing against the stopper plate 7 of the guide shaft 5 with a thrust bearing 35 interposed therebetween, these members being longitudinally disposed on one and the same straight line.

A hopper 29 for supplying a material to be molded into the heating cylinder 1 through a pipe 28 is connected to the heating cylinder 1.

The reference numeral 19 designates an electric motor disposed parallel to these constituents and controlled by a controller 30. The electric motor 19 is secured to an injection unit base 21 on which the heating cylinder 1 is fixedly held. An input shaft 18 is connected to the electric motor 19 through a joint sleeve 20. Two upper and lower clutches 16 and 17 (the clutch 16 will hereinafter be referred to as the measurement and blending clutch and the clutch 17 will hereinafter be referred to as the injection clutch) are secured to the input shaft 18. The measurement and blending clutch 16 is made connectable to an input timing pulley 14, which in turn is connected through a timing belt 12 and elements 23a and 23b to an output side timing pulley 10 secured to the outer periphery of a spline nut 8 fitted to the spline shaft 3. Accordingly, when the clutch 16 is connected to the pulley 14, the spline shaft 3 is rotated by the rotating driving of the electric motor 19 through the pulley 14, the timing belt 12, the timing pulley 10 and the spline nut 8, whereby the screw 2 is rotated. The clutch 17 is made connectable to an input side timing pulley 15, which in turn is connected through a timing belt 13 to an output side timing pulley 11 secured to a ball nut 9. Accordingly, when the clutch 17 is connected to the pulley 15, the ball nut 9 is rotated by the rotating driving of the electric motor 19 through the pulley 15, the timing belt 13 and the timing pulley 11, whereby the hollow ball screw 6 is vertically moved.

A projected piece 31 having a cross-section as shown in FIG. 1 is attached to the hollow ball screw 6, and a guide bar 32 secured (not shown) to the injection unit base 21 is fitted to the bifurcated end portion of the projected piece 31, whereby with the rotation of the ball nut 9, the hollow ball screw 6 is not rotated but can only be rectilinearly moved relative to the guide shaft 5.

The hollow ball screw 6 is slidably provided on the guide shaft 5 as described above, and is designed to be vertically moved with the rotation of the ball nut 9, but since the stopper plate 7 having a larger diameter than the hollow ball screw 6 is secured to the upper end of the guide shaft 5 and the lower end of the guide shaft 5 is secured to the spline shaft 3 also having a larger diameter than the hollow ball screw 6, the hollow ball screw 6 will bear against the stopper plate 7 in the upper portion thereof and against the spline shaft 3 in the lower portion thereof when it is vertically moved. Accordingly, since the stopper plate 7, the guide shaft 5, the spline shaft 3 and the screw 2 are integrally fixed to one another as described above, the hollow ball screw 6 is vertically moved with the rotation of the ball nut 9 operatively associated with the rotating driving of the electric motor 19, to thereby push out the stopper plate 7 or the spline shaft 3, whereby the screw 2 can be vertically moved in the heating cylinder 1.

A back pressure cylinder 22 is mounted (not shown) on the injection unit base 21, and is disposed on the same straight line as the stopper plate 7, the guide shaft 5, the spline shaft 3 and the screw 2 as described above, and vertically moves the cylinder rod 33. As a result, the cylinder rod 33 can be lowered to press the stopper plate 7 and apply back pressure to the screw 2. The reference numeral 23 denotes a pressure adjuster for the back pressure cylinder. The pressure adjuster 23 is connected to the back pressure cylinder 22 through a tube 334, and is also connected to a supply source of compressed fluid such as air, not shown. The press control of the back pressure cylinder 22 is accomplished by controlling the pressure of the compressed fluid by the pressure adjuster 23.

By the back pressure mechanism of such a construction, thrust can be imparted to the screw 2 against the pressure created in the molten material to be molded accumulated forwardly of the screw by the measurement and blending of the material to be molded, whereby bubbles or the like can be prevented from being created in the molten material to be molded when no back pressure is applied. Also, the back pressure mechanism in the present embodiment is designed to be performed by the pushing-out operation of the back pressure cylinder 22 as described above and therefore is simple in construction, and the control source thereof can be constructed of a simple mechanism and adjustment can also be accomplished easily.

A thrust bearing 35 provided at the lower end of the cylinder rod 33 and adapted to bear against the stopper plate 7 comprises two angular bearings stacked symmetrically with each other the inner races of two angular bearings being fixed by a nut threadably engaged with the stepped portion of the cylinder rod 33 and the tip end of the cylinder rod 33, the outer races of two angular bearings being fixed by being nipped by and between a cylindrical member having a shoulder and a cylindrical member having a protruded portion. When the cylinder rod 33 bears against the stopper plate 7, the cylindrical members are rotated and the cylinder rod 33 is not rotated because the two angular bearings intervene. The reference numerals 24, 25, 26 and 27 designate sensors for detecting the stroke of the screw 2 or the hollow ball screw 6. The sensor 24 is a suck-back completion detecting sensor, the sensor 25 is a measurement completion detecting sensor, the sensor 26 is a screw overrun detecting sensor, and the sensor 27 is a hollow ball screw waiting position sensor. These sensors 24, 25, 26 and 27 are mounted so as to be suitably movable with respect to the injection unit base 21 to thereby adjust their detecting positions.

In the present embodiment, each sensor is a reflection type photoelectric sensor, and the suck-back completion detecting sensor and the measurement completion detecting sensor are used with the side surface of the stopper plate 7 as a sensor dog and the hollow ball screw waiting position sensor is used with the side surface of the hollow ball screw 6 as a sensor dog, and each sensor is adapted to become ON when the stopper plate or the hollow ball screw has moved to a position in which light impinges on each sensor. Also, the overrun detecting sensor is used with the side surface of the hollow ball screw 6 as a sensor dog, and is adapted to become ON when the hollow ball screw has moved to a position in which no light impinges on the sensor.

B) Description of the Nozzle Touch Mechanism

First Embodiment

The nozzle touch mechanism in the apparatus of the present embodiment is mounted on a lower die support member 21a protruding from the unit base 21. A stepped bolt 34 as a guide shaft is slidably inserted in each of the four corners (only two of which are shown) of an upper die mounting plate 36, and a through-hole 36a formed with a concave groove 36b capable of receiving the head of the stepped bolt 34 therein is provided in the lower portion thereof, and a large hole 36c for inserting therein the heating cylinder 1 held by an upper support die member 21b is formed centrally of the upper die mounting member 36. With respect to such an upper die mounting member 36, the stepped bolt 34 is inserted in the respective through-hole 36a through a spring 30 and is fastened to the lower portion of the lower die support member 21a.

Further, an upper die member 37 is secured to the upper die mounting plate 36 from below it as by bolt fastening. The central portion of the upper die member 37 has a hot chip 50 in which a heater 39 is provided and a hot runner is formed. The upper entrance portion of the hot chip 50 is formed into a shape substantially converse to the shape of the nozzle of the heating cylinder 1, and the nozzle 1A at the end of the heating cylinder 1 bears against this runner entrance portion.

By the nozzle touch mechanism constructed as described above, the upper die mounting plate 36 and the upper die member 37 secured thereto are biased upwardly by the resilient force of the spring 30 and accordingly, the nozzle 1A at the end of the heating cylinder 1 is urged against the runner entrance portion of the upper die member 37. This nozzle touch force can be adjusted by changing the resilient force by replacing the spring 30 with another spring. The spring can be suitably selected from among a counter-sunk spring, a compression spring, etc.

Thus, the nozzle touch mechanism of the present embodiment is designed to display its nozzle touch force by the upper die member 37 being biased relative to the heating cylinder 1 and therefore, unlike the prior-art mechanism in which the entire injection unit is moved relative to the upper die member, it can be constructed so as to be simple and to hardly require a mounting space.

Below the upper die member 37, a lower die mounting plate 46 having a lower die member 38 secured thereto is provided so as to be vertically guided by a guide post 45, and the lower die member 38 can be vertically moved by a cylinder for vertically moving the lower die mounting plate 46.

Figure 2A:
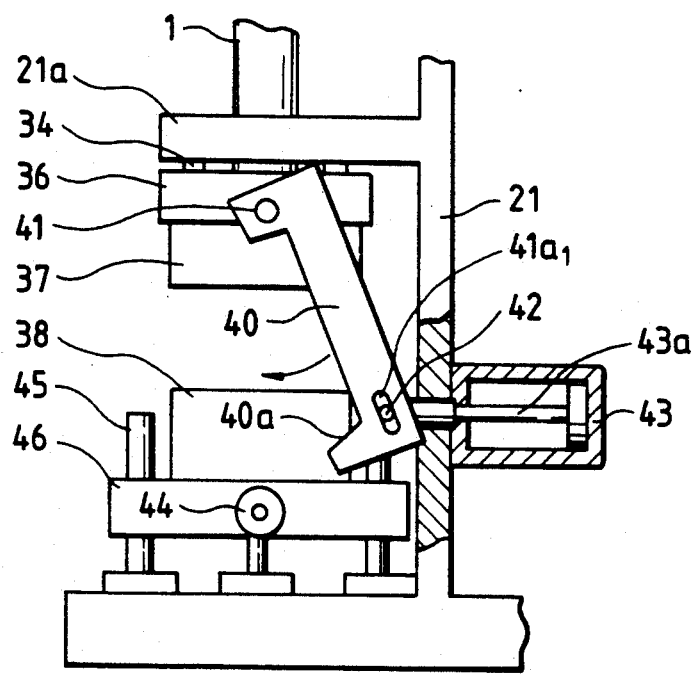
FIGS. 2A and 2B show the surroundings of the upper and lower die members of FIG. 1, and particularly show the mold clamping operation of the upper and lower die members, FIG. 2A showing the state before the mold clamping, and FIG. 2B showing the state during the mold clamping.
Figure 2B:
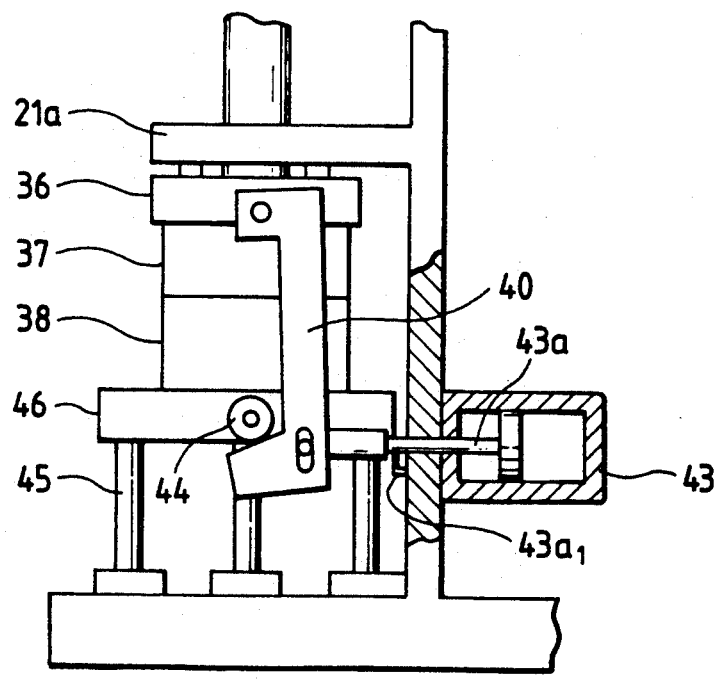

The mold clamping of these upper and lower dies can be accomplished by a clamp arm 40. This clamp arm, as shown in FIG. 2A, has its upper portion joined to the side of the upper die mounting plate 36 by a hinge 41 and has its lower portion joined by a hinge 42 inserted in a groove 41a, in arm 40, to the rod end of a rod 43a a clamp arm driving cylinder 43 secured to the unit base 21, and can be rotated in the direction of the arrow by the horizontal driving of the cylinder 43. Also, the lower end portion of the clamp arm 40 is provided with a wedge portion 60 formed into a wedge-like shape, and when as shown in FIG. 2B, the lower die mounting plate 46 is moved up by a cylinder 38A to join the upper die member 37 and the lower die member 38 together, the clamp arm 40 is driven by the cylinder 43 to bring the wedge portion 60 into engagement with a cam follower 44 attached to the side of the lower die mounting plate 46, and the lower die member 38 can be biased relative to the upper die member 37 by the wedge action of the wedge portion 60 to thereby provide the mold clamping force of the upper and lower dies. During molding, the cylinder 43 is left as it is pushed out, whereby the clamp arm 40 is locked in the state shown in FIG. 2 to thereby maintain the mold clamping force.

The clamp arm 40, cam follower 44, etc. are likewise provided also on the side opposite to the side shown, and such a pair of mold clamping mechanisms are designed to perform an operation similar to that described above. Also, if in such mechanisms, only one clamp arm driving cylinder 43 is provided and the pair of clamp arms 40 are operated at a time, the mold clamping force can easily be made to work uniformly.

C) Description of the Operation of the Apparatus

Figures 1, 4A:
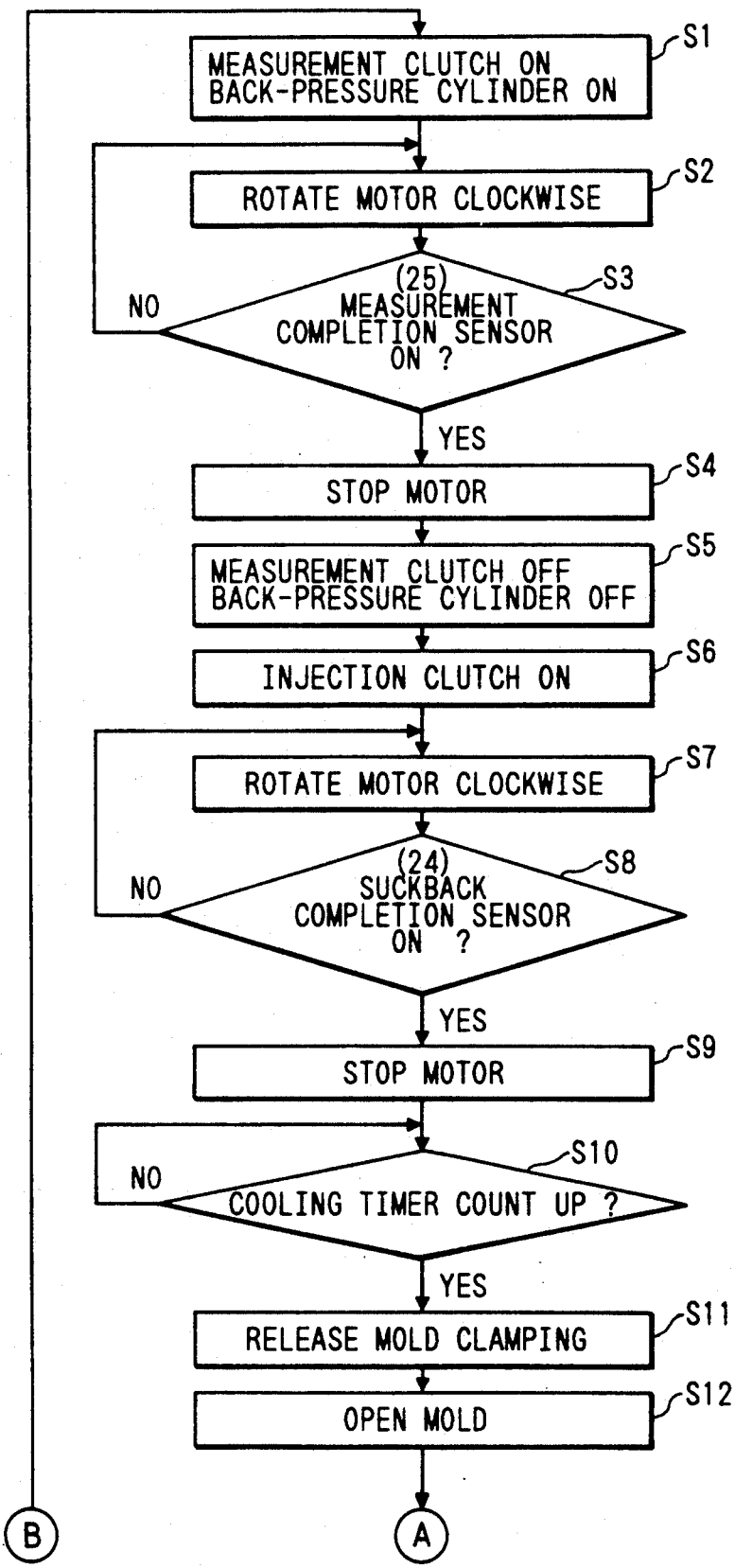
Figure 4B:
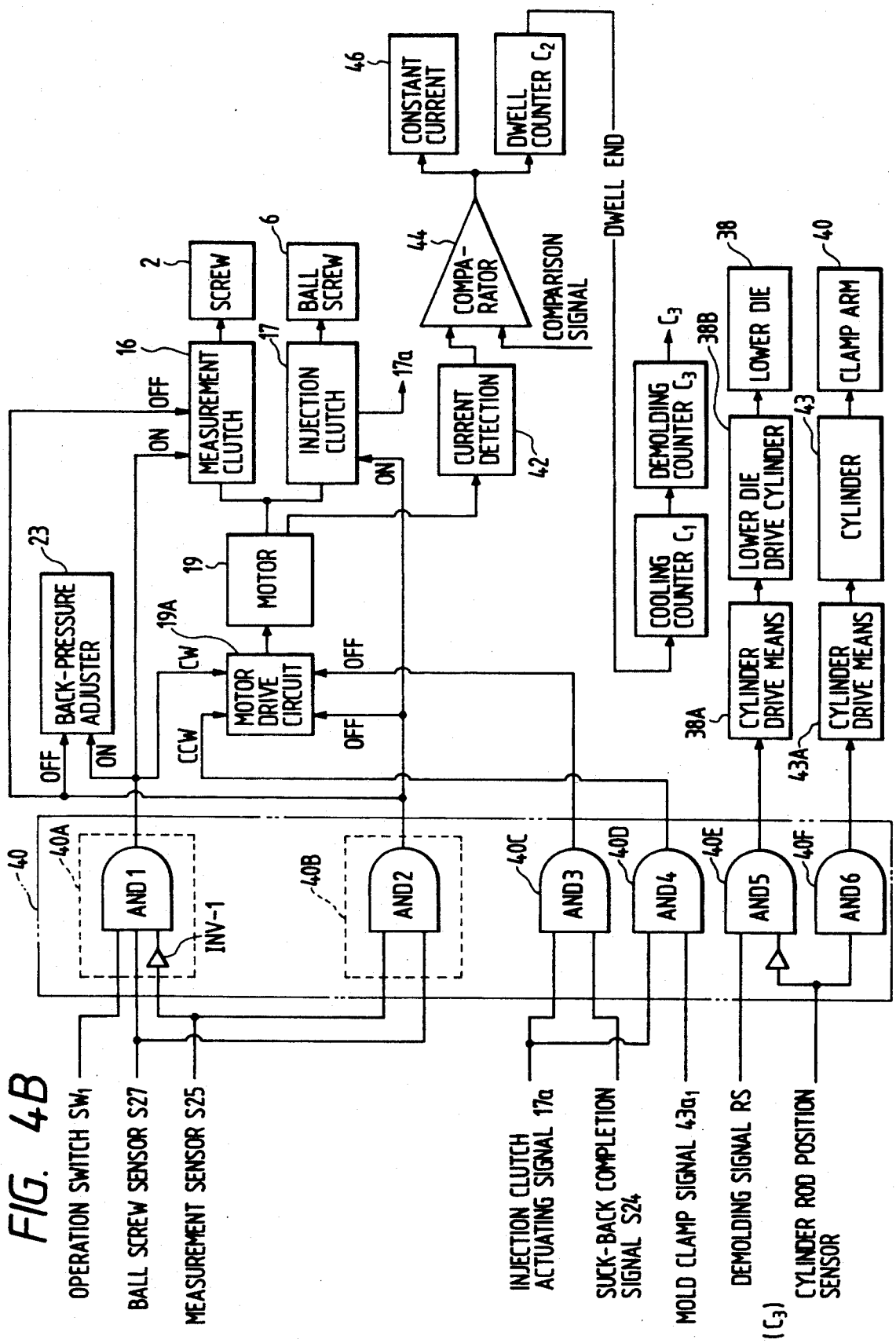
FIG. 4B is a block diagram.

The operation of the electric type injection molding apparatus of the present embodiment constructed as described above will now be described with reference to the operational views of FIGS. 3A-3E, the flow chart of FIG. 4A and the block diagram of FIG. 4B. The symbols indicated with S in the parentheses below designate the steps in the flow chart of FIG. 4A.

i) Measuring and Blending Mode

Referring to FIG. 3A, the hollow ball screw 6 is in a position for rendering the hollow ball screw waiting position sensor 27 ON and at the same time, the back pressure cylinder 22 and the measurement clutch 16 are also in their ON states (step S1). At this time, the motor 19 rotates clockwise with the output signal of first logic means 40A being input to the drive means 19A of the motor 19 (step S2). The first logic means 40A comprises the measurement and blending detecting sensor 25, the ball screw waiting position detecting sensor 27, an AND circuit 70 for inputting the signal of an operation switch SW1 indicative of the present apparatus being in operation, and an inverter (negation) circuit INV-1 for receiving the signal of the measurement sensor 25.

That is, in the state of FIG. 3A, the ball screw waiting position detecting sensor 27 is ON, the measurement sensor 25 is OFF and the switch SW1 is ON, and the logic means 40A outputs to the motor drive circuit 19A a signal for rotating the motor 19 clockwise and at the same time, the measurement and blending clutch 16 is rendered ON to thereby make the rotation of the motor 19 transmissible to the rotation transmitted means of the spline shaft 3 through the belt 12. Further, the output signal of the first logic means renders the pressure adjuster 23 operative. In this manner, the motor 19 is rotated clockwise (CW) (step 52), and the screw 2 is rotated through the timing belt 12, the spline nut 8 and the spline shaft 3 and is moved up in the heating cylinder 1 while measuring and blending the material to be molded supplied into the heating cylinder 1. Simultaneously therewith, back pressure is imparted to the screw 2 by the back pressure cylinder 22 via the stopper plate 7, the guide shaft 5 and the spline shaft 3.

ii) Measurement and Blending Terminating Mode

When the screw 2 is then moved up to a position shown in FIG. 3B, a signal indicative of the measurement completion detecting sensor 25 being ON is received (S3).

The ON signal of the measurement completion detecting sensor 25 and the ON signal of the ball screw waiting position detecting sensor 27 resulting from the upward movement of the screw 2 are input to second logic means 40B, and the supply of electric power to the motor drive means 19A is stopped by the signal from the second logic means 40B to thereby stop the motor 19 (step 54).

Also, the measurement clutch 16 and the pressure adjuster are rendered OFF by the signal from the second logic means 40B to thereby effect the release of the clutch and the release of the back pressure. Thereby the measurement and blending mode is terminated (step S5).

On the other hand, when the measurement and blending of the material to be molded is being effected in the cylinder 1 as described above, the material to be molded which has been measured and blended at the previous step is contained in a metal mold (not shown) provided below the cylinder 1, and cooling and removal of the molded article is effected therein. Thus, at this time, it is necessary to effect suck-back to prevent the material to be molded blended in the cylinder 1 from leaking from the injection port of the cylinder 1.

iii) Suck-back Mode

In the state in which at the step S5, the motor 19 has been stopped and the back pressure has been released, the injection clutch 17 is operated by the output signal from the second logic means 40B to thereby connect the motor 19, the ball nut 9 and the ball screw 6 together (step S6).

The injection clutch 17 outputs a signal 17a representative of the operated state of the injection clutch, and on the basis of this signal 17a, a signal for rotating the motor 19 clockwise is output from the motor drive means 19A (step S7). When the hollow ball screw 6 is moved up thereby through the timing belt 13 and the ball nut 9, the stopper plate 7 is pushed up and suck-back is effected. This suck-back is continued until as described above, the hollow ball screw 6 is moved up to a position shown in FIG. 3C in which the suck-back completion detecting sensor 24 is rendered ON (S8). The ON signal of the suck-back completion detecting sensor 24 and the signal 17a representative of the operated state of the injection clutch 17 are input to third logic means 40C, from which a signal for stopping the motor 19 enters the motor drive means 19A. Thereby the motor 19 is stopped (step S9), and the suck-back is completed. In FIG. 3C, the letter a designates the suck-back stroke and the letter b denotes the movement stroke of the hollow ball screw during the suck-back.

After the completion of the suck-back, the counting by the cooling counter $C_1$ is terminated (step S10). By a signal $C_1$ indicative of the termination of the counting by the cooling counter $C_1$, the operation of the mold clamping means of the metal mold is released to thereby release the mold clamping of the metal mold (step S11), and the mold opening is effected (step S12), whereafter the molded article is removed (step S13).

iv) Mold Clamping Mode

The molded article removing process may be accomplished by removing the molded article directly from the mold manually, or by using a robot, not shown. To expedite automation, in the present embodiment, the removal of the molded article by a robot, not shown, will be considered.

In the molded article removing operation by a robot, not shown, the robot's hand comes from its waiting position into the intermediate position in which the upper die 37 and the lower die 38 are opened, and the molded article is gripped by the hand. Thereafter, the hand is retracted.

Upon completion of the retraction of the robot's hand, a molded article removed signal (release signal RS) is output. This molded article removal signal RS may be the count completion signal of a molded article removing counter $C_3$ operated after the termination of the counting by the cooling counter $C_1$ at the step S10, and timing out after the required from after the termination of cooling till the mold opening steps S12 and the molded article removing step S13. When the removal of the molded article at the step S13 is terminated, the closing of the upper die and the lower die is effected for the next molding cycle, but after the removal of the molded article, the upper die and the lower die are in their open state. The lower die mounting plate 46 having the lower die 38 fixed thereto is connected to the cylinder rod 38a of the lower die driving cylinder 38A, and by the operation of the cylinder 38A, the opening-closing operation of the lower die and the upper die is effected with the vertical movement of the rod 38a and the lower die mounting plate 46.

A sensor $38a_2$ for detecting the moved position of the cylinder rod 38a is mounted on the guide plate $38a_1$ of the cylinder rod 38a. This sensor $38a_2$ is designed to output a logic signal "1" as an operation signal when the cylinder rod 38a is moved by a predetermined amount in the direction for closing the lower die, and output a logic signal "0" when the mold is open. Accordingly, the molded article removal signal RS or the counting termination signal $C_3$ of a third counter is output after the removal of the molded article at the step S13.

Further, the signal of the position sensor $38a_2$ of the cylinder rod 38a is inverted, and this inverted signal and the removal signal RS are input to a fifth logic circuit 40E, and drive means 38B for operating the cylinder 38A for driving the lower die mounting plate 46 is actuated by these signals. Thus, the lower die 38 bears against the upper die 37 by virtue of the upward movement of the lower die mounting plate and the mold closing operation is performed (step S14).

When the movement of the rod 38a by the operation of the lower die driving cylinder 38A reaches an amount necessary for the closing of the lower die and the upper die, the cylinder rod position sensor $38a_2$ outputs a signal "1".

This signal of the position sensor $38a_2$ operates sixth logic means 40F, whereby the mold clamping means (mold clamp operating means) is actuated. That is, the drive means 43A of the clamp operating cylinder 43 is actuated by the sixth logic means 40F, whereby as shown in FIGS. 2A and 2B, the crank arm 40 is pivotally moved in the direction of arrow about the hinge 41 by the horizontal movement of the cylinder rod 43a of the cylinder 43. A pin 42 studded in the fore end of the cylinder rod 43a fits in a slot $41a_1$ formed in the fore end of the crank arm 40. Accordingly, with the leftward movement of the cylinder rod 43a as viewed in the figure, the pin 42 pivotally moves the crank arm 40 in the direction of arrow while moving in the slot $41a_1$. The cam follower 44 comes into engagement with the tip end of the wedge-shaped portion (inclined portion) 60 of the crank arm as shown in FIG. 2B, whereby the clamping operation of the upper die and the lower die is performed (step S15).

v) Injection Mode

The blended material to be molded is injected into the metal mold clamped as described above. The injection operation is accomplished by the motor 19 being rotated to push down the rectilinear movement transmitted means of the hollow ball screw 6. That is, the amount of movement of the cylinder rod 43a of the mold clamping cylinder 43 is detected by the position sensor $43a_1$. The position sensor $43a_1$ is mounted on the unit base 21 and outputs a signal in the mold clamping completion position of the cylinder 43 by the crank arm 40. Accordingly, the mold clamping completion signal is formed by the position sensor $43a_1$. The mold clamping signal of the mold clamping means and the operated state signal 17a of the injection clutch 17 are input to fourth logic means 40D, and the motor 19 is rotated counter-clockwise (CCW) by the signal of the fourth logic means 40D (step S16). At this time, the injection clutch 17 is continuously in its ON state and therefore, when the motor 19 is rotated counter-clockwise, downward thrust is imparted to the hollow ball screw 6. In this case, the hollow ball screw 6 is first idly fed, whereafter as shown in FIG. 3D, the lower end portion of the hollow ball screw 6 strikes against the shoulder 3a of the spline shaft, whereby the screw 2 is pushed out downwardly and the injection into the metal mold is effected. Since the back pressure cylinder 22 is OFF, the cylinder rod 33 remains in the position of FIG. 3C. The control of the motor 19 during the injection is effected by the controller 30, and any variation in the value of the consumed current of the motor 19 at the end of the injection (S18), and the control of the motor for the injection is changed from speed control (S17) to current value control (S19), whereby the injection is completed and shift is made to a dwell state in which a predetermined pressure is applied to the material to be molded. That is, the number of revolutions of the motor 19 is rendered constant and the speed of lowering of the ball screw 6 is rendered constant, and injection is effected at a constant speed. However, during this injection, the pressure of the material to be molded becomes higher as the cavity of the metal mold is filled with the material to be molded and therefore, to maintain the constant injection speed as described above, progressively more electric current must be supplied to the motor 19. Accordingly, provision is made of detecting means 42 for detecting the current value flowing to the coil, not shown, of the motor 19 to determined a constant current value, and input is made to comparator means 44 for comparing the detecting means 42 with a predetermined comparative value.

vi) Dwell

The time when the value of the consumed current has reached the comparative value is defined as the time of completion of the injection process. In accordance with the comparison signal of the comparator means 44, the supply of electric power to the motor 23 is kept constant by a constant current circuit 46 to thereby bring about a state in which a predetermined pressure is acting on the resin material in the cavity of the metal mold. The comparison signal from the comparator means 44 causes a counter $C_2$ for dwell which controls the dwell time to start counting (step S19). Assuming that FIG. 3D is the completed state of the injection, C is the movement stroke of the hollow ball screw and d is the injection stroke. The reference numeral 26 designates a screw overrun detecting sensor, and in a normal operation, the completed state of the injection is brought about at a position above the sensor 26.

When a dwell timer then counts up (S20), the motor 19 is stopped to complete dwell, and the counting by the cooling timer is started (step S21).

When dwell is completed as described above, in preparation for the next measurement and blending, the motor 19 is rotated clockwise (step S22) while the injection clutch 17 is kept in its ON state, and the hollow ball screw 6 is lifted until the hollow ball screw waiting position sensor 27 becomes ON, and when the hollow ball screw waiting position sensor 27 has become ON (step S23), the motor 19 is stopped (step S24) and the hollow ball screw 6 is made to wait at that position, as shown in FIG. 3E. Also, at this time, the injection clutch 17 switched off (step S25). In FIG. 3E, the letter e designates the movement stroke of the hollow ball screw.

After the steps as described above, the measurement clutch 16 and the back pressure cylinder are again switched on (step S1), and by the above-described steps being repeated, the blending and measurement of the material to be molded, back pressure, suck-band and injection can be effected.

As shown in the foregoing description of the operation, in the present invention, measurement and blending is effected in a state in which the hollow ball screw 6 is moved up to and stopped at the measurement waiting position and the injection clutch 17 is disengaged, i.e., a state in which the injection clutch is completely disconnected from the drive source of the motor 19 for rectilinearly moving the screw 2. That is, during the measurement and blending, only a rotating drive force is imparted to the screw 2, and in the vertical direction, the screw 2 is completely disconnected from the rectilinearly driving system (the motor 19, the ball screw 6, the ball nut 9, etc.) and thus, in the vertical direction of the screw 2, only upward thrust by the measurement of the material to be molded is produced and the screw 2 is moved up as the measurement progresses. At this time, the back pressure imparted to the screw 2 to suppress the irregularity of measurement is determined by only the output of the back pressure cylinder 22, and the volume of the measured material to be molded is determined by the length of the movement stroke of the screw 2 detected by the measurement completion detecting sensor 25.

In the present embodiment, photoelectric sensors are used as the sensors 24, 25, 26 and 27, but alternatively, a microswitch may be used and the end portion or the like of the stopper plate 7 may be brought into contact with the microswitch to thereby change over the switch.

As described above, the injection molding apparatus shown in FIGS. 1 to 4A and 4B is designed such that the mold closing operation of the lower die 38 and the mold clamping of the clamp arm 40 and cam follower 44 are controlled by the detection signal of the mold clamping cylinder 43, whereby the automation of the molding apparatus could be achieved. Also, the control of the direction of rotation (CCW) of the driving circuit 19A of the single motor which effects measurement and blending and injection driving is logically controlled on the basis of the mold clamping signal $43a_1$, whereby the drive source for the measuring and blending step and the injection step could be made single.

A second embodiment of the present invention is shown in FIGS. 5A to 8. The second embodiment has a support member for holding an injection cylinder unit, and an upper die member adapted to bear against the tip end of the nozzle of the injection unit and having secured thereto a guide member for guiding the upper die member relative to the support member, the guide member being provided with means for biasing the die member toward the support member so that the touch force of the nozzle with respect to the upper die member may be created by the biasing force of the biasing means, whereby there is provided a nozzle touch mechanism which is simple is construction and suitable for an injection molding apparatus using a small power source such as a motor as the injection drive source.

The second embodiment will hereinafter be described with reference to the drawings.

Figure 5A:
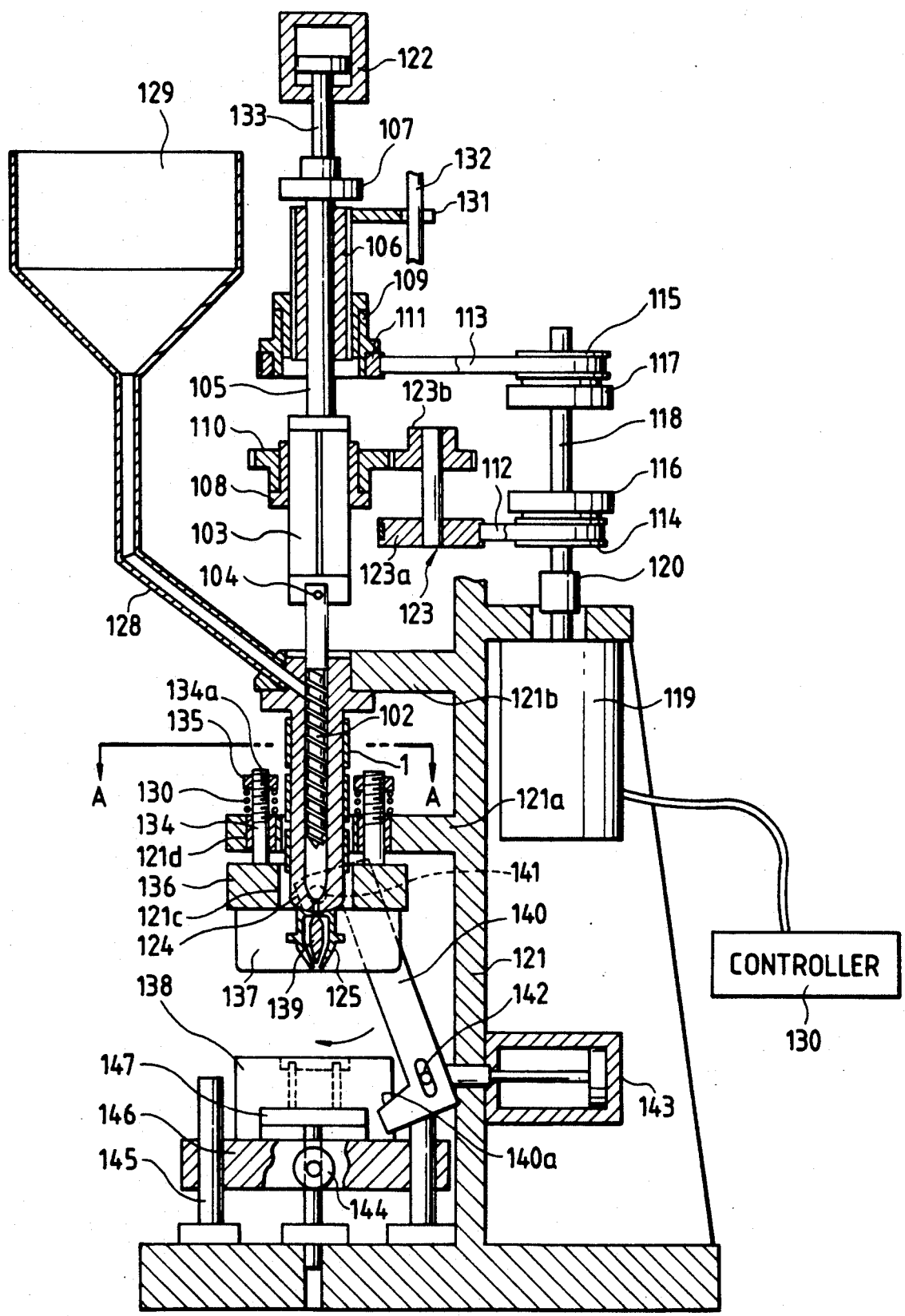
FIGS. 5A, 5B, 5C and 6 show a second embodiment of the present invention, FIG. 5A showing, partly in cross-section, the general construction of an electric type injection molding apparatus according to the second embodiment of the present invention, FIG. 5B being a cross-sectional view of the mounting portion for a nozzle touch mechanism in the apparatus of FIG. 5A, FIG. 5C being a cross-sectional view taken along line A—A of FIG. 5A, and FIG. 6 showing the construction of the essential portions of the apparatus of FIG. 5, and particularly showing a state in which mold clamping has been effected.
Figure 5B:
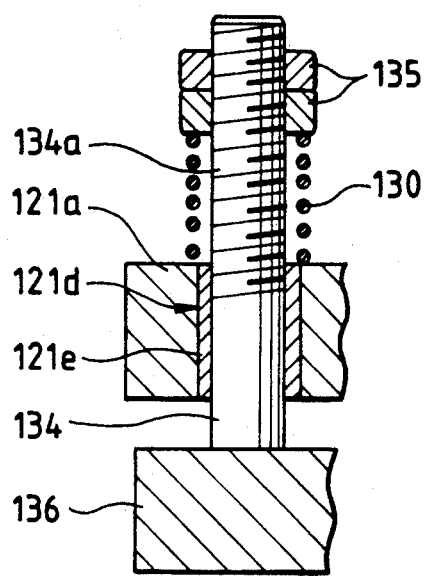
Figure 5C:
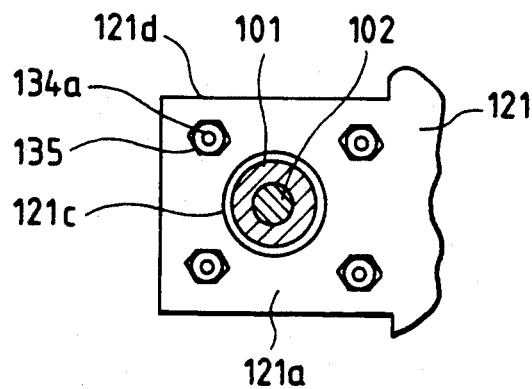
Figure 6:
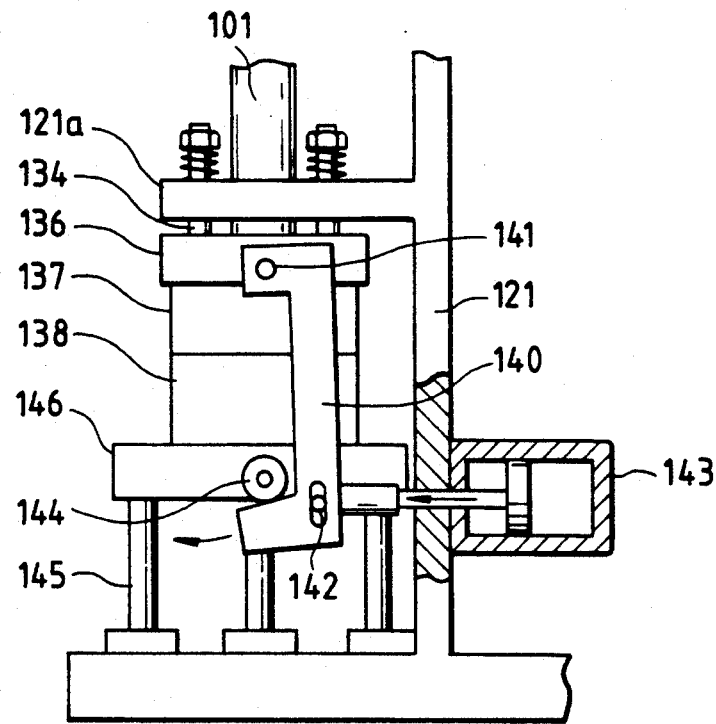
Figure 9:
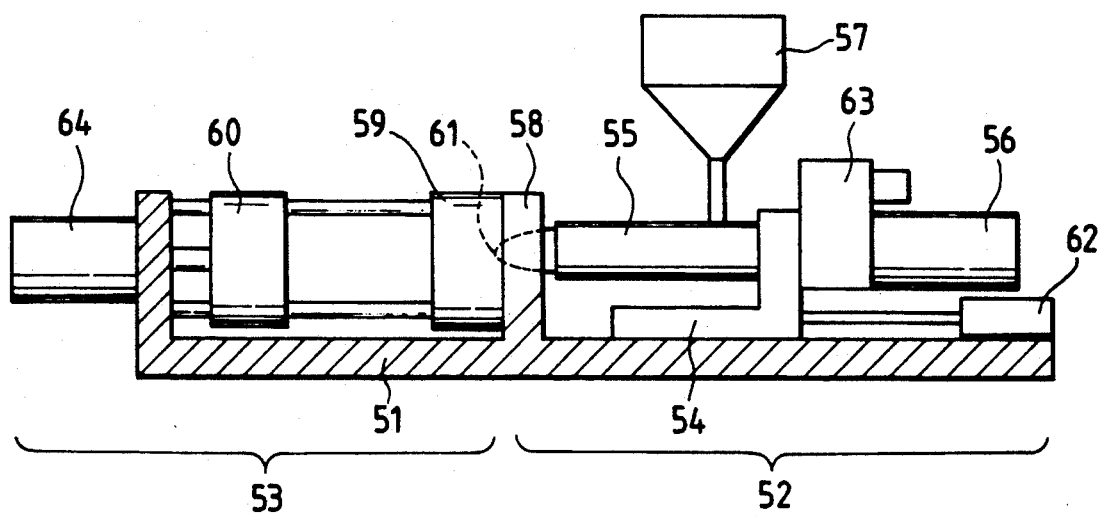
FIG. 9 illustrates an apparatus according to the prior art.

FIG. 5A shows, partly in cross-section, the general construction of an electric type injection molding apparatus according to the present embodiment, FIG. 5B is a cross-sectional view of the essential portions of the mounting unit of the nozzle touch mechanism in FIG. 5A, FIG. 5C is a cross-sectional view taken along line A—A of FIG. 5A, and FIG. 6 shows the construction of the essential portions of the apparatus shown in FIG. 5, and particularly shows a state in which mold clamping has been effected in the apparatus.

The injection unit of the injection molding apparatus shown in FIG. 5A comprises a screw 102 contained in a heating cylinder 101, a spline shaft 103 fixed to the screw 102 by a pin 104, a hollow ball screw guide shaft 105 connected to the upper portion of the spline shaft 103 by a bolt or the like, not shown, and having a stopper plate 107 secured to the upper end thereof, a hollow ball screw 106 slidably fitted on the hollow ball screw guide shaft 105, and a cylinder rod 133 provided above the guide shaft 105 and bearing against the stopper plate 107 of the guide shaft 105 with a thrust bearing 160 interposed therebetween, these members being longitudinally disposed on one and the same straight line.

A hopper 129 for supplying a material to be molded into the heating cylinder 101 through a pipe 128 is connected to the heating cylinder 101.

The reference numeral 119 designates an electric motor disposed parallel to these constituents and controlled by a controller 130. The electric motor 119 is secured to a unit base 121 on which the heating cylinder 101 is fixedly held. An input shaft 118 is connected to the electric motor 119 through a joint sleeve 120. Two upper and lower clutches 116 and 117 (the clutch 116 will hereinafter be referred to as the measurement and blending clutch and the clutch 117 will hereinafter be referred to as the injection clutch) are secured to the input shaft 118. The measurement and blending clutch 116 is made connectable to an input timing pulley 114, which in turn is connected to the lower pulley 123a of a rotation transmitting mechanism 123 through a timing belt 112 and further, the upper spur gear 123b of the rotation transmitting mechanism 123 and an output side spur gear 110 secured to the outer periphery of a spline nut 108 fitted on the spline shaft 103 are connected together. Accordingly, when the clutch 116 is connected to the pulley 114, the spline shaft 103 is rotated by the rotating driving of the electric motor 119 through the pulley 114, the timing belt 112, the rotation transmitting mechanism 123, the spur gear 110 and the spline nut 108, whereby the screw 102 is rotated.

The clutch 117 is made connectable to an input side timing pulley 115, which in turn is connected through a timing belt 113 to an output side timing pulley 111 secured to a ball nut 109. Accordingly, when the clutch 117 is connected to the pulley 115, the ball nut 109 is rotated by the rotative driving of the electric motor 119 through the pulley 115, the timing belt 113 and the timing pulley 111, whereby the hollow ball screw 106 is vertically moved.

A projected piece 131 is attached to the hollow ball screw 106, and a guide bar 132 secured (not shown) to the unit base 121 is slidably fitted to the bifurcated end portion of the projected piece 131, whereby with the rotation of the ball nut 109, the hollow ball screw 106 is not rotated but can only be rectilinearly moved relative to the guide shaft 105.

The hollow ball screw 106 is slidably fitted on the guide shaft 105 as described above, and is designed to be vertically moved with the rotation of the ball nut 109, but since the stopper plate 107 having a larger diameter than the hollow ball screw 106 is secured to the upper end of the guide shaft 105 and the lower end of the guide shaft 105 is secured to the spline shaft 103 also having a larger diameter than the hollow ball screw 106, the hollow ball screw 106 will bear against the stopper plate 107 in the upper portion thereof and against the spline shaft 103 in the lower portion thereof when it is vertically moved. Accordingly, since the stopper plate 107, the guide shaft 105, the spline shaft 103 and the screw 102 are integrally fixed to one another as described above, the hollow ball screw 106 is vertically moved with the rotation of the ball nut 109 operatively associated with the rotative driving of the electric motor 119, to thereby push out the stopper plate 107 or the spline shaft 103, whereby the screw 2 can be vertically moved.

A back pressure cylinder 122 is mounted (not shown) on the unit base 121, is disposed on the same straight line as the stopper plate 107, the guide shaft 105, the spline shaft 103 and the screw 102 as described above, and vertically moves the cylinder rod 133. As a result, the cylinder rod 133 can be lowered to press the stopper plate 107 and apply back pressure to the screw 102.

A nozzle touch mechanism in the apparatus of the present embodiment is mounted on a lower support member 121a protruding from the unit base 121, and when the lower support member 121a is downwardly viewed along line A—A as shown in FIG. 5C, a large hole 121c into which the heating cylinder 101 may be inserted is formed centrally of the lower support member 121a and small holes 121d into which guide members 134 may be inserted are formed at the four corners around the large hole 121c.

The upper end portion of the heating cylinder 101 is fixedly supported on an upper support member 121b protruding from the unit base 121, and the fore end portion of the heating cylinder 101 is inserted in the large hole 121c in the lower support member 121a as described above. The lower end portions of the four guide members 134 inserted in respective ones of the small holes 121d in the lower support member 121a through bushes 121e are secured to an upper die mounting plate 136, and two nuts 135 are threadably engaged with the bolt portions 134a of the guide members 134 at the upper ends thereof, and a coil spring 130 is interposed between the nuts 135 and the lower support member 121a (see FIG. 5B). The upper die member 137 has a hot chip 125 for forming a hot runner, and a heater 139 is provided therein, and the upper end portion of the hot chip 125 is formed into a shape substantially converse to that of a nozzle 124.

With such a construction, by the nuts 135 being fastened with respect to the coil spring 130, the upper die member 137 is biased upwardly and accordingly, the nozzle 124 is urged against the upper end portion of the hot chip 125 of the upper die member 137. To adjust the nozzle touch force displayed at this time, the fastening stroke of the nuts 135 may be adjusted to thereby change a biasing force produced in the coil spring 130.

On the other hand, below the upper die member 137, a lower die mounting plate 146 having a lower die member 138 secured thereto is provided so as to be vertically guided by a guide post 145, and the lower die member 138 can be vertically moved by a cylinder, not shown, for vertically moving the lower die mounting plate 146.

The mold clamping of these upper and lower dies can be accomplished by a clamp arm 140. The clamp arm 140, as shown in FIG. 6, has its upper portion joined to the side of the upper die mounting plate 136 by a hinge 141 and has its lower portion joined by a hinge 142 to the rod end of a clamp arm driving cylinder 143 secured to the unit base 121, and can be rotated in the direction of arrow by the horizontal driving of the cylinder 143. Also, the lower end portion of the clamp arm 140 is provided with a wedge portion 140a formed into a wedge-like shape, and when as shown in FIG. 6, the lower die mounting plate 146 is moved up by a cylinder, not shown, to join the upper die member 137 and the lower die member 138 together, the clamp arm 140 is driven by the cylinder 143 to bring the wedge portion 140a into engagement with a cam follower 144 attached to the side of the lower die mounting plate 146, and the lower die member 138 can be biased relative to the upper die member 137 by the wedge action of the wedge portion 140a to thereby provide the mold clamping force of the upper and lower dies. During molding, the cylinder 143 is left as it is pushed out, whereby the clamp arm 140 is locked in the state shown in FIG. 6 to thereby maintain the mold clamping force.

The clamp arm 140, cam follower 144, etc. are likewise provided also on the side opposite to the side shown, and such a pair of mold clamping mechanisms are designed to perform an operation similar to that described above. Also, if in such mechanisms, only one clamp arm driving cylinder 143 is provided and the pair of clamp arms 140 are operated at a time, the mold clamping force can easily be made to work uniformly.

The nozzle touch mechanism in the present embodiment is simple in construction and requires a small mounting space and moreover, can display a sufficient nozzle touch force and therefore, it is best suited for a compactly and slimly constructed electric type injection molding apparatus used in the present embodiment.

As described above, the nozzle touch mechanism of the injection molding apparatus of the present invention, unlike the large-scale one of the prior art in which the entire injection unit is driven, can urge the upper die member against the nozzle to thereby provide an effective nozzle touch force by a very simple and inexpensive construction.

Accordingly, the nozzle touch mechanism of the present invention is also suitable for a compact and slim vertical type electric injection molding apparatus, and the nozzle touch force thereof can be adjusted, for example, by adjusting the fastening stroke of the nut to thereby change the produced output of the coil spring, or by suitably changing the biasing force of the guide member by replacement of the spring.

Description of a Third Embodiment

A third embodiment of the present invention is a nozzle touch mechanism in which an injection unit having a screw for blending and measuring a material to be molded in a heating cylinder, means for rotatably driving the screw, and means for injection-driving the screw is supported on a frame which is mounted for movement relative to the base of an apparatus body holding a metal mold, by screw driving, so the nozzle of the heating cylinder and the metal mold may be nozzle-touched, whereby the nozzle touch mechanism is constructed simply and is also suitable for a compact and slim injection molding apparatus.

Figure 7:
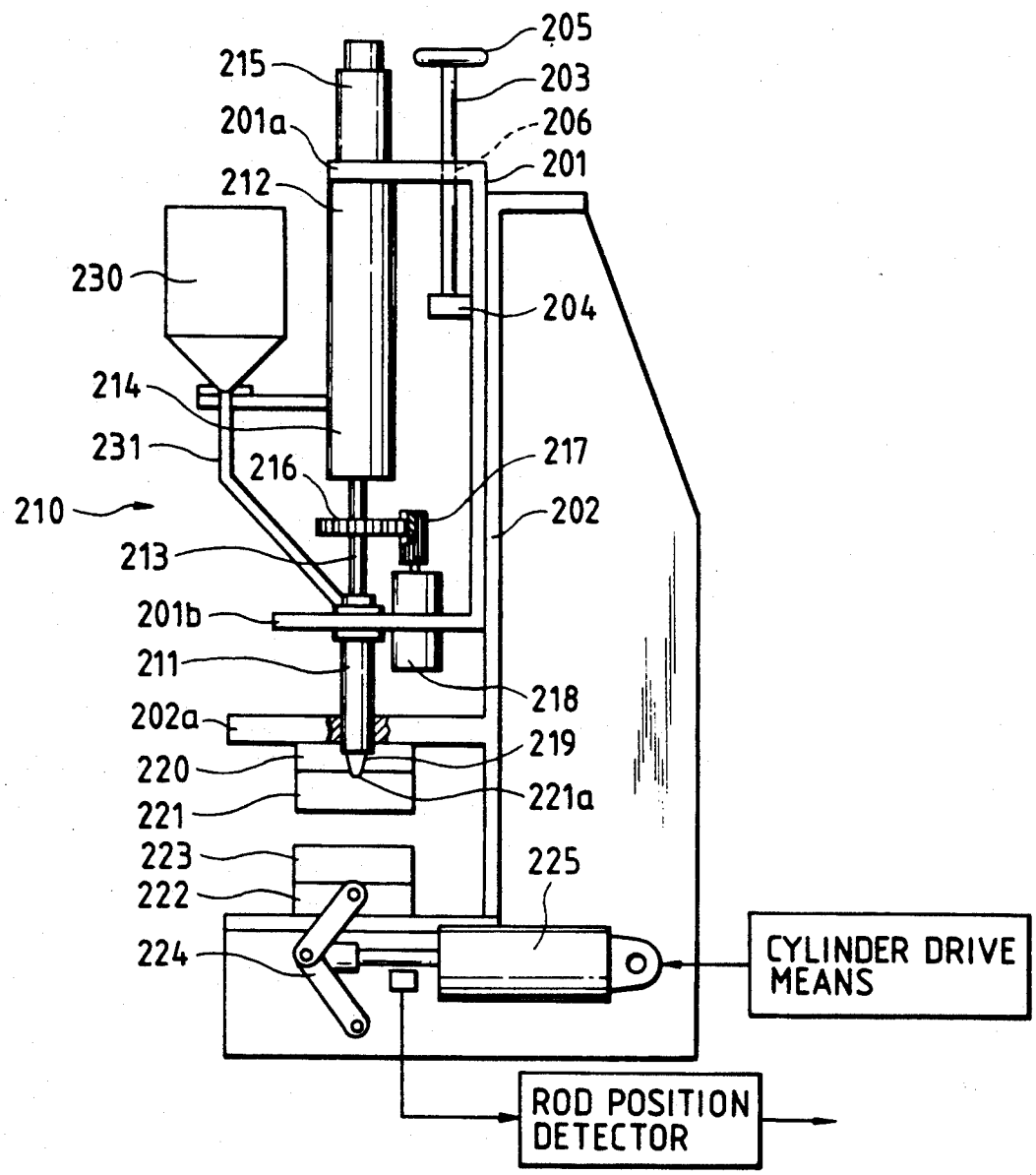
FIGS. 7 and 8 show a third embodiment of the present invention, FIG. 7 showing the construction of the essential portions of a molding apparatus including a nozzle touch mechanism, and FIG. 8 illustrating the tip end of a nozzle.
Figure 8:
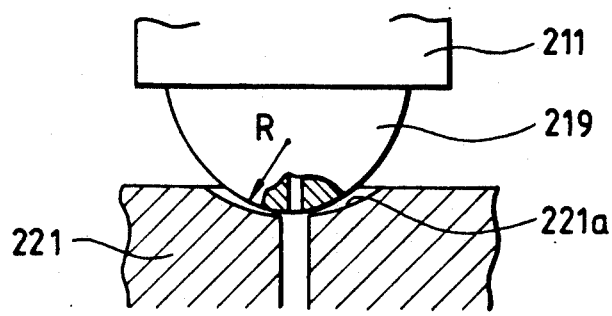

The injection molding apparatus shown in FIG. 7 is constructed into a vertical type, and the reference numeral 201 designates a frame for supporting an injection unit 210 by upper and lower cantilevers 201a and 201b, and the reference numeral 202 denotes a body base for vertically slidably supporting the frame 201 along a guide. The upper cantilever 201a of the frame 201 is formed with an internal thread 206 threadably engaged with a threaded bar 203, and a fixed member 204 is secured to the side of the body base 202, and the lower end portion of the threaded bar 203 is pivotably held on the fixed member. Accordingly, by rotating a handle 205 secured to the upper end portion of the threaded bar 203 to the left and right, the frame 201 can be screw-driven and vertically moved relative to the body base 202.

The injection unit 210 supported on the frame 201 has a heating cylinder 211 containing a screw (not shown) therein, a rotary shaft 213 fixed to the rear of the screw, a rectilinearly moving mechanism 212 having a ball screw and a ball nut (not shown) connected to the upper portion of the rotary shaft 213, and an injection motor 215 connected to the ball screw, and the upper end portion of the rectilinearly moving mechanism 212 is fixed to the upper cantilever 201a and the upper end portion of the heating cylinder 211 is fixed to the lower cantilever 201b, whereby the entire injection unit 210 is supported on the frame 201.

A driven side gear 216 is fixed to the rotary shaft 213, and a drive side gear 217 engaged with the gear 216 is secured to the rotary shaft of a blending and measuring motor 218 fixed to the lower cantilever 201b.

A support beam 202a for supporting an upper die mounting plate 220 is provided below the intermediate cantilever 201b of the body base 202, an upper die 221 is secured to the lower portion of the upper die mounting plate 220, and a lower die mounting plate 222 having a lower die 223 secured thereto is provided below and in opposed relationship with the upper die. The support beam 202a and the upper die mounting plate 221 are formed with through-holes for making the heating cylinder 211 vertically movable, and a nozzle 219 provided at the fore end of the heating cylinder is adapted to bear against a recess 221a around the introduction port of the upper die 221 (see FIG. 8).

The nozzle touch of the nozzle 219 with the upper die is accomplished by rotating the handle 205 as described above to thereby lower the frame 201 relative to the body base 201. At this time, by the fastening force of the threaded bar 203, a nozzle touch force of several hundred kilograms is produced relative to the recess 221a around the introduction port of the upper die 221.

A link 224 is provided on the lower die mounting plate 222, and by this link being vertically moved by an air cylinder 225, the lower die 223 can bear against the upper die 221.

A hopper 230 is connected to the heating cylinder 211 through a pipe 231, and a material to be molded charged into this hopper is blended and melted in the heating cylinder 211.

The operation of the injection molding apparatus of the above-described construction will now be described.

Prior to injection molding, the handle 205 of the threaded bar 203 is manually rotated to lower the frame 201, thereby urging the nozzle 219 against the recess 221a around the introduction port of the upper die 221. The nozzle 219 is then fastened until the nozzle touch force thereof relative to the recess 221a reaches a predetermined magnitude. In the injection molding apparatus of the present embodiment, a runner portion is constructed in a hot runner for keeping the material to be molded passing therethrough in a molten state so that during injection molding, the nozzle touch force may always be kept at a predetermined magnitude by the fastening force of the threaded bar 213.

On the other hand, the air cylinder 225 is driven to stretch the link 224 and bring the lower die 223 into contact with the upper die 221, thereby forming a predetermined molding cavity between the upper and lower dies.

Also, the material to be molded is charged into the hopper 230 and the blending and measuring motor 218 is rotated, whereby the screw is rotated through the drive side gear 217, the driven side gear 216 and the rotary shaft 213 to thereby blend and measure the material to be molded. As the blending and measurement progress, the molten material to be molded is accumulated forwardly of the screw and the screw is gradually retracted. When a predetermined volume of molten material to be molded has thus been accumulated forwardly of the screw, the blending and measuring motor 218 is stopped.

When the injection motor 215 is then rotatably driven, this rotation is converted into a rectilinear movement by the action of the ball screw and ball nut of the rectilinearly moving cylinder, whereby the screw is pushed out through the rotary shaft 213 and the molten material to be molded accumulated forwardly of the screw is injected into the cavity between the upper and lower dies 221 and 223. At this time, the above-mentioned nozzle touch acts to prevent the molten material to be molded from leaking from the recess 21a around the introduction port, and by way of the cooling process after molding, the air cylinder 225 is driven to shrink the link 224, thereby lowering the lower die 223 and opening the mold, whereafter the molded article is removed.

In the nozzle touch mechanism of such an electric type injection molding apparatus, the handle 205 can be manually rotated and a predetermined nozzle touch force can be simply produced by the fastening force of the threaded bar 213. Also, the threaded bar 213 can be constructed very simply and its slim posture can be maintained even when it is mounted in the vertically constructed injection molding apparatus of the present embodiment.

During the maintenance of the nozzle portion of the injection molding apparatus of the present embodiment, the handle 205 may be rotated to move up the frame 201, thereby separating the nozzle 219 from the upper die 221.

Also, the nozzle touch mechanism in the present embodiment is designed to be mounted in a vertical type injection molding apparatus, but as a matter of course, it can also be mounted in a horizontal type injection molding apparatus to display a similar effect.

As described above, the nozzle touch mechanism of the electric type injection molding apparatus of the present invention is designed such that by screw driving, the heating cylinder is moved relative to the metal mold to thereby accomplish nozzle touch and therefore, can be constructed of a simple mechanism, and even when each element of the injection molding apparatus is constructed into a slim shape on the propelling shaft of the screw, that slim shape is not destroyed and thus, this nozzle touch mechanism is also suitable, for example, for a compact and slim vertical type injection molding apparatus.

Further, this nozzle touch mechanism using screw driving not only can be reduced in manufacturing cost, but also can be designed to be manually operated with ease and therefore, its running cost may be low.

We claim:

1. A nozzle touch mechanism in an injection molding apparatus,
   said injection molding apparatus comprising:
   a screw housed in a heating cylinder;
   rotating means for rotating said screw;
   linear moving means for moving said screw linearly;
   a motor for driving said rotating means;
   driving means for driving said linear moving means; and
   a base member for supporting said screw, said rotating means, said linear moving means, said motor, and said driving means, wherein said screw, said linear moving means and rotating means are supported by said base member along a vertical axis,
   said nozzle touch mechanism comprising:
   a support member mounted on said base member;
   a member for mounting an upper die member, mounted on said support member;
   wherein an upper die member is mounted to said member for mounting an upper die member so that a molding material entrance port of the upper die member engages an injection port of the heating cylinder; and
   a spring member provided between said member for mounting an upper die member and said support member so as to exert a nozzle touch force on the heating cylinder and the upper die member wherein said upper die member is movable against a lower die member to form a mold cavity.

2. A nozzle touch mechanism according to claim 1, wherein said member for mounting an upper die member has a recess portion having a through hole for housing said spring member, wherein the through-hole receives a bolt to mount said member for mounting an upper die member on said support member fixed on said support member.

3. A nozzle touch mechanism in an injection molding apparatus, comprising:
   a heating cylinder housing a screw;
   rotating means for rotating the screw;
   linear moving means for moving the screw linearly;
   driving means for driving said linear moving means;
   a frame for supporting said heating cylinder, said linear moving means, and said rotating means along a vertical axis;
   a body base for supporting said frame along the vertical axis;
   a support beam extending from said frame, an upper die member mounted to said support beam; and
   pressing means for pressing an injection port of said heating cylinder against a molding material entrance port of the upper die member, wherein said pressing means contacts said heating cylinder and the upper die member between said heating cylinder and the upper die member in response to a downward motion of said frame which is moved relative to said body base wherein said upper die member is movable against a lower die member to form a mold cavity.

4. A nozzle touch mechanism according to claim 3, wherein said pressing means comprises:
 a threaded portion provided on said frame; and
 a threaded bar engaging said threaded portion, wherein an edge of said bar is supported by said body base.

* * * * *

UNITED STATES PATENT AND TRADEMARK OFFICE
CERTIFICATE OF CORRECTION

PATENT NO. : 5,143,736
DATED : September 1, 1992
INVENTOR(S) : Masaaki Kumamura, et al.

It is certified that error appears in the above-identified patent and that said Letters Patent is hereby corrected as shown below:

COLUMN 9:

Line 40, "to determined" should read --to determine--.
Line 55, "for" should read --to--.

COLUMN 11:

Line 3, "is" (second occurrence) should read --in--.

Signed and Sealed this

Twenty-sixth Day of October, 1993

Attest:

BRUCE LEHMAN

Attesting Officer

Commissioner of Patents and Trademarks